May 4, 1954     A. KRETZSCHMAR     2,677,433

PROCESS AND APPARATUS FOR DEGASSING BOILER FEED WATER

Filed Oct. 23, 1951

Inventor:
Alfred Kretzschmar

By Watson, Cole, Grindle & Watson

Patented May 4, 1954

2,677,433

UNITED STATES PATENT OFFICE 2,677,433

PROCESS AND APPARATUS FOR DEGASSING BOILER FEED WATER

Alfred Kretzschmar, Kulmbach, Germany

Application October 23, 1951, Serial No. 252,787

Claims priority, application Germany November 15, 1950

13 Claims. (Cl. 183—2.5)

The invention relates to a process, especially adapted for degassing boiler feed water, and to an apparatus for performing the mentioned process.

According to the invention the feed water to be degassed is mixed in a pressure and mixing chamber with water of condensation delivered e. g. from a preheater, vaporizer etc. The water is then atomized by means of nozzles and the atomized water is caught by perforated sheets of metal and trickled through them, being finally collected in a bowl and conducted into a container to be boiled. By these steps the water finally mixed, boiled and whirled by heating steam is heated in the shortest time to boiling temperature and thereby the last residue of gases, which were not separated previously during the atomizing and trickling process are removed.

The feed water and the condensate are introduced into the pressure and mixing chamber preferably tangentially to the wall. The mixture is atomized suitably in atomizing nozzles provided at the bottom of the pressure and mixing chamber. The trickled water collected in a bowl may be conducted through a dipping tube provided at the bowl and leading into the boiling vessel. Suitably steam is supplied to the boiling vessel through tangentially arranged or tangentially and centrally directed nozzles. By means of those nozzles the mentioned quick boiling of the water takes place in the shortest time as the water is caused to whirl with the steam.

For performing the process according to the invention a degassing apparatus may be used comprising a pressure and mixing chamber provided with inlet tubes for the untreated water and the condensate and with a bottom provided with spraying nozzles. This bottom is followed by a chamber in which perforated sheets are provided for trickling the atomized water. Below the perforated sheets, bowls are arranged opening with a dipping tube into a boiling vessel heated by steam. This apparatus is provided above a feed water container which may stand erect. In this case the container of the degassing apparatus suitably forms a unitary structure together with the feed water container. However, the feed water container may also be arranged horizontally. If vertically arranged the feed water container may suitably be provided at its lower end with additional heating steam nozzles in order to keep the feed water at the boiling temperature also at the delivering place. If the feed water container is horizontally arranged additional heating steam nozzles are generally superfluous because the decrease of temperature at the delivering place of the degassed water may be kept smaller if the apparatus is so constructed.

According to the invention an outlet pipe for the fumes may suitably be provided, centrally arranged and passing preferably through the upper pressure and mixing chamber. Fume condensers inserted into the steam outlet pipe serve for causing the fumes to deposit.

The fresh water and the condensate may be tangentially introduced through spiral-like bent tubes provided with exit openings; the heating steam is introduced into the water preferably by nozzles which may tangentially admit the water to the walls of the boiling vessel.

According to the invention a degassing plant is produced in which the water may be atomized, trickled and heated centrally in the degassing container. Thus, according to the invention, it becomes possible to tangentially introduce the condensate as well as the heating steam and, if suitable, also the feed water.

According to a further feature of the invention the degassing apparatus and the feed water container may form a unitary structure without special flange connection between the degassing apparatus and the feed water container.

As proved by extensive tests it is possible to nearly entirely remove the gases contained in the feed water. It has become possible to expel the gases up to hardly measurable residues, which means an excellent result.

Further details of the invention may be seen from the embodiment illustrated in the accompanying drawing.

Figure 1:
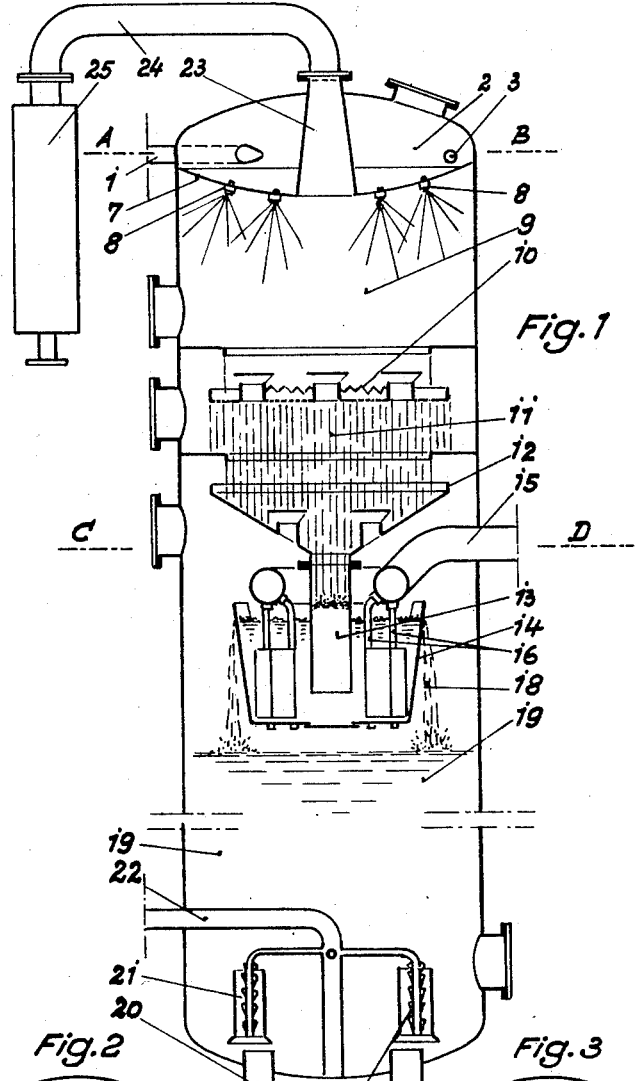
Fig. 1 is a longitudinal section through a plant according to the invention arranged above a vertical feed water container.
Figure 2:
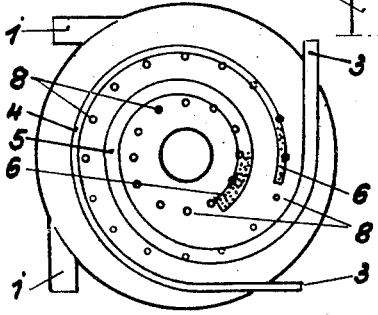
Figs. 2 and 3 are sections in the direction of the lines A—B and C—D of Fig. 1 respectively.
Figure 3:
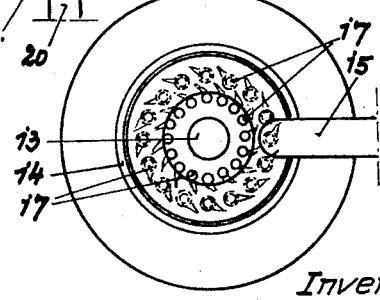

The feed water to be degassed is supplied to the pressure and mixing chamber 2 through the pipe 1. To this chamber also condensate is supplied through the pipe 3 extending into the chamber in the shape of spirals 4 and 5 as to be seen from Fig. 2. The spirals have exit openings 6 for the condensate. In consequence of the arrangement according to the invention an intimate mixing of condensate and feed water results in the chamber 2. At the bottom 7 of this pressure and mixing chamber 2 nozzles 8 are provided for atomizing the mixed fluid. The atomized fluid is fed by means of the nozzles 8 into the space 9. Here perforated sheets 10 are provided for catching the atomized water. The water trickles through the holes in the perforated sheets 10 into the space 11, where it is collected by means of a bowl 12. A partially submerged pipe 13 leads the trickled fluid into a boiling vessel 14 into which also heating steam is supplied through the pipe 15 and the distributing pipes 16. At the ends of the pipes 16 exit nozzles 17 are provided as to be seen from Fig. 3, said nozzles being adjustable and tangentially directed towards the edge of the container. The entering steam whirls-up the water in the container so that it is heated to the boiling temperature in the shortest time. Thus the remaining trace of gases which are still left in the water are expelled. The fluid heated to the boiling temperature runs over the edge of the boiling vessel as indicated at 18 and flows into the feed water container 19 which, in the illustrated embodiment, forms a unitary structure with the degassing apparatus. At the delivery outlets 20 of the degassed feed water additional heating steam nozzles 21 are provided in the feed water container, fed by the pipe 22. Thus the degassed water delivered from the outlets 20 has a boiling temperature.

Generally an additional heating steam plant at the outlets is not required if the feed water container 19 is horizontally arranged. In this case the container and the degassing apparatus form also a unit so that special flange connections between degassing apparatus and feed water container are superfluous in connection with the vertical arrangement of the feed water container as well as with the horizontal arrangement. By the construction of the apparatus as suggested and as to be seen from the drawing the tangential introduction of the steam, of the condensate and, if required, also of the feed water is assisted.

The outlet 23 of the fumes passes through the mixing and pressure chamber 2 in the middle of the container. Fume condensers 25 are connected with the outlet 23 by means of pipes 24, in which condensers the fumes deposit.

What I claim is:

1. A process for degassing boiler feed water consisting in mixing the untreated feed water to be degassed with water of condensation, atomizing the mixture, catching the atomized mixture by perforated sheets, trickling it through said sheets, collecting the trickling water and boiling it.

2. A process for degassing boiler feed water consisting in mixing the untreated feed water to be degassed with water of condensation, atomizing the mixture, catching the atomized mixture by perforated sheets, trickling it through said sheets, collecting the trickling water, and supplying heating steam, thereby heating the water to the boiling temperature.

3. A process for degassing boiler feed water consisting in supplying the untreated feed water to be degassed and a proportion of water of condensation to a mixing chamber in a direction tangential to the wall of the chamber, mixing the supplied substances, atomizing the mixture, catching the atomized mixture by perforated sheets, trickling it through said sheets, collecting the trickling water and boiling it.

4. An apparatus for degassing feed water comprising, in combination, a pressure and mixing chamber, inlet pipes leading into said chamber and adapted to supply untreated water and water of condensation, atomizing nozzles provided at the bottom of said chamber, an enclosure adjacent said chamber, perforated sheets arranged in said enclosure and adapted to trickle the atomized water supplied by said nozzles, a bowl arranged below said sheets and adapted to catch the trickling water, a boiling vessel arranged below said bowl, a pipe connected with said bowl and dipping into said boiling vessel and a feed water container arranged below said boiling vessel and adapted to receive the water from the boiling vessel.

5. An apparatus for degassing feed water as claimed in claim 4 in combination with means adapted to supply the untreated water and the water of condensation to said pressure and mixing chamber tangentially to the wall of said chamber.

6. An apparatus for degassing feed water as claimed in claim 4 in combination with means coacting with said boiling vessel and adapted to supply heating steam to it.

7. An apparatus for degassing feed water consisting of a degassing plant and a feed water container, the degassing plant comprising a pressure and mixing chamber, inlet pipes leading into said chamber and adapted to supply untreated water and water of condensation, atomizing nozzles provided at the bottom of said chamber, an enclosure adjacent said chamber, perforated sheets arranged in said enclosure and adapted to trickle the atomized water supplied by said nozzles, a bowl arranged below said sheets and adapted to catch the trickling water, a boiling vessel arranged below said bowl, a pipe connected with said bowl and dipping into said boiling vessel; and said feed water container being arranged below said boiling vessel and forming a unitary structure with said degassing plant.

8. An apparatus for degassing feed water as claimed in claim 7 in combination with additional nozzles provided in the lower portion of the feed water container and adapted to supply heating steam, the said degassing plant and feed water container being arranged vertically one above the other.

9. An apparatus for degassing feed water as claimed in claim 4 in combination with an exit pipe for the fumes.

10. An apparatus for degassing feed water as claimed in claim 4 in combination with an exit pipe for the fumes, centrally arranged and passing through the pressure and mixing chamber.

11. An apparatus for degassing feed water as claimed in claim 4 in combination with an exit pipe for the fumes, centrally arranged and passing through the pressure and mixing chamber, and a fume condenser inserted into said exit pipe.

12. An apparatus for degassing feed water as claimed in claim 4 in combination with spirally bent pipes arranged within said pressure and mixing chamber provided with exit openings, continuing the said inlet pipes and adapted to supply the untreated water and the water of condensation to said pressure and mixing chamber tangentially to the wall of said chamber.

13. An apparatus for degassing feed water as claimed in claim 4 in combination with means coacting with said boiling vessel and adapted to supply heating steam to it, said means comprising nozzles adapted to admit the heating steam tangentially to the walls of the boiling vessel.

References Cited in the file of this patent

UNITED STATES PATENTS

| Number | Name | Date |
| --- | --- | --- |
| 1,715,456 | Jones | June 4, 1929 |
| 1,797,405 | Elliott | Mar. 24, 1931 |
| 1,943,890 | Gibson | Jan. 16, 1934 |
| 2,041,059 | French | May 19, 1936 |
| 2,308,721 | Sebald | Jan. 19, 1943 |
| 2,483,448 | Weitzen | Oct. 4, 1949 |
| 2,545,028 | Haldeman | Mar. 13, 1951 |

FOREIGN PATENTS

| Number | Country | Date |
| --- | --- | --- |
| 638,198 | Great Britain | May 31, 1950 |